Patented Sept. 8, 1925.

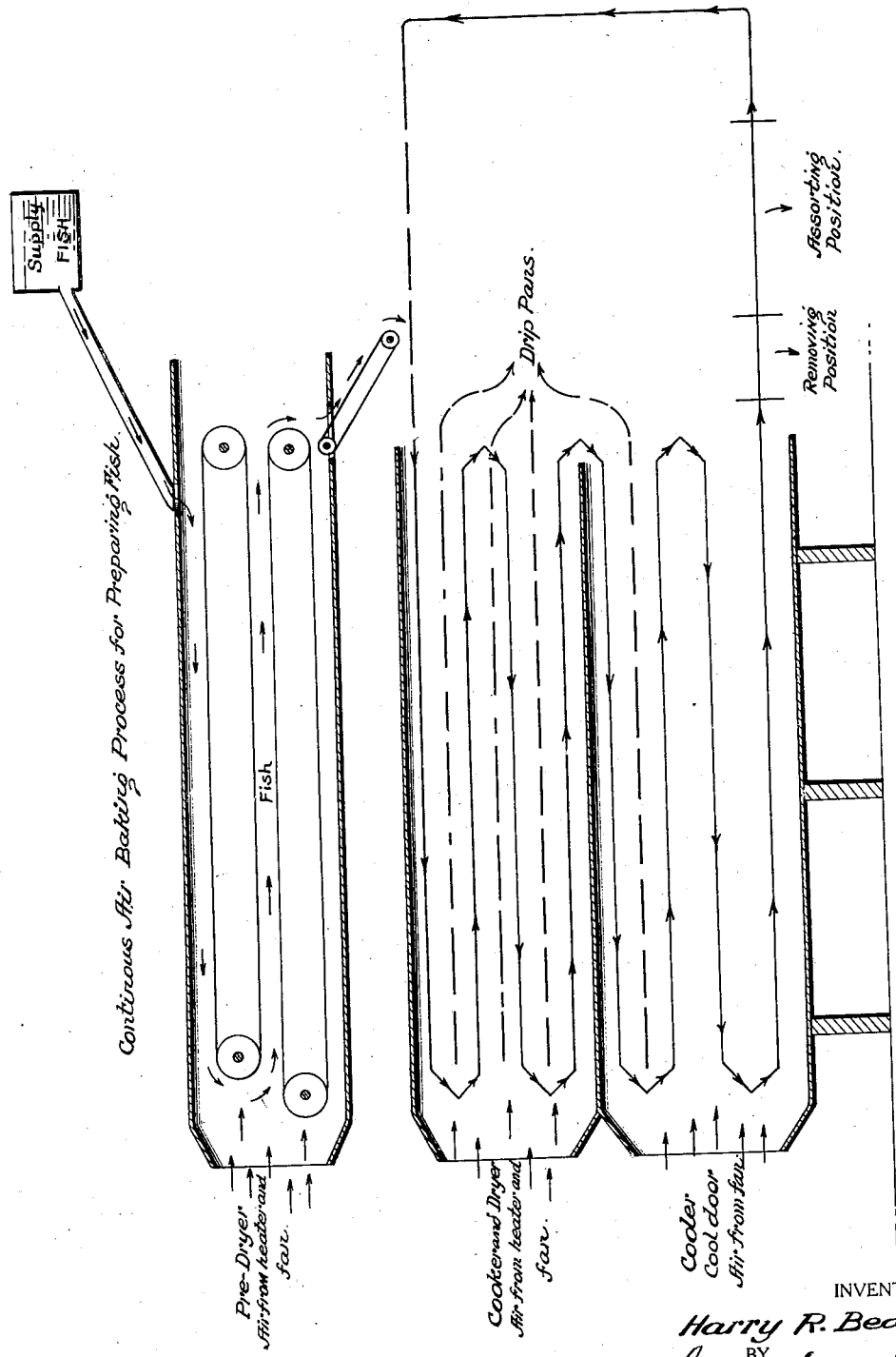

1,553,296

UNITED STATES PATENT OFFICE.

HARRY R. BEARD, OF SAN PEDRO, CALIFORNIA.

METHOD OF PREPARING FISH FOR CANNING.

Application filed October 7, 1924. Serial No. 742,132.

*To all whom it may concern:*

Be it known that I, HARRY R. BEARD, citizen of the United States, residing at San Pedro, in the county of Los Angeles and State of California, have invented certain new and useful Improvements in Methods of Preparing Fish for Canning, of which the following is a specification.

This invention relates to an improved method of preparing fish for canning and more particularly to the preparation of such fish as sardines, pilchards, herring and other fish of similar character.

Heretofore it has been the usual practice in preparing such fish for canning to employ either of two general methods. By one of these methods the fish, having been cleaned, decapitated, disentrailed, washed and brined in the usual manner, or just salted without cleaning, are placed on wire trays and steamed, thence dried by means of warmed air, cooled and packed into cans, covered with oil or sauce, sealed, and finally cooked and sterilized in hot water or steam; while by the second method the fish, having been similarly conditioned for the process, are partially dried, pre-cooked in hot oil, steam or brine, cooled, packed into cans and sealed, after which they are thoroughly cooked in steam retorts.

A careful study of the "packs" resulting from these and other methods reveals the facts that the ultimate success of the packs is, in the main, dependent upon five factors, namely: (1) the fish themselves, including the preliminary conditioning, handling and cleaning of the same; (2) preparation of the fish for the canning; (3) materials placed in the can with the fish; (4) the canning process itself; and (5) chemical changes which take place in the can both during processing and after the process has been completed.

These factors are all relatively important, but previous study and experience has practically solved the majority of difficulties formerly met with in the preliminary cleaning and conditioning processes, as well as the actual canning processes, while the same experience has shown that the failure of a pack largely results from deleterious chemical and physical changes due directly to improper preparation of the fish for canning, and that the substances placed in the cans with the fish may be, the other steps having been properly performed, determined largely as a matter of taste.

The present invention, therefore, with these facts in view, has for its object the production of a method for preparing the fish for the canning operation, which will substantially preclude the possibility of subsequent failure of the pack due to deleterious chemical and physical changes occurring either during or after the completion of the preparation of the fish for canning.

Another object of the invention is the production of a method that will be continuous in its operation and one which will yield the above mentioned results and at the same time will be quicker, simpler, more efficient and more economical than the present methods in practice.

The method, the steps of which are illustrated diagrammatically in the accompanying drawings, consists in conveying the fish, after they have been cleaned, decapitated, disentrailed, washed and brined in the usual manner on a wire screen belt through a chamber and there subjecting them to a current of rapidly moving heated air. The fish while within said chamber are preferably shifted at least once from one position to another so as to present their entire outer surface to the direct action of the heated air. Under the action of the rapidly moving heated air the skins of the fish are toughened and the fish themselves are partially dried. This step is primarily for the purpose of conditioning certain varieties of fish for the cooking step, which will be hereinafter fully described, it having been found that under certain conditions, for example, when the fish are particularly lean, or deficient in natural oil or fat, there is an excessive tendency for the fish to stick to the trays employed during the cooking process if the predrying and toughening step just described is omitted. Experience has shown, however, that in most instances the fish possess sufficient natural oil to render this step non-essential, and that, therefore, under proper conditions, it may be omitted without affecting the final condition of the product or the results to be obtained.

The fish having been conditioned for the cooking process, assuming their physical state to be such as to render this step essential, are placed upon wire trays carried by a suitable chain belt or the like, and conveyed through a chamber into which heated air is forced, the air being preferably heated to a temperature at least sufficient to cook the fish and forced through the chamber at a relatively high velocity. It is of course apparent that in the event the fish possess sufficient natural oil, or are otherwise such as to render the conditioning step unnecessary, they may be immediately subjected to the cooking process just described.

In connection with the cooking process it is to be noted that in cooking fish which are subsequently to be canned, it is highly desirable that the actual cooking be conducted under conditions and in a manner such that the loss of natural oil, salt and soluble extractives of the fish is reduced to a minimum, and that the physical appearance of the fish remain substantially unchanged. These results are accomplished by the present method in that by subjecting the fish to a blast or current of hot air moving at a relatively high velocity there is a rapid transfer of heat from the air to the fish, which causes a sudden contraction of the flesh cells. This frees the inherent moisture which, by reason of the high temperature prevailing, diffuses rapidly to the surface of the fish where, under the influence of the excellent drying conditions there obtaining, the water is immediately evaporated, leaving behind the soluble extractives which are so desirable in the final product. This rapid evaporation of the moisture also keeps the skins tough and dry, whereby the natural oils and fats are retained. The physical appearance of the fish is substantially unchanged by reason of the fact that the blast of hot, dry air tends to cook the fish quickly and without discoloration such as is experienced by using a "frying in oil process", and without the leaching and breaking experienced in the "steaming processes".

The fish, having been cooked and dried to the desired degree, are conveyed upon the same trays to another chamber in which they are subjected to rapidly moving air of a relatively lower temperature, whereby the fish are quickly cooled and rendered firm for subsequent handling. The fish are then ready for immediate packing, and to this end they are conveyed between rows of packers who lift the fish from the trays and pack them directly into the cans, which are subsequently filled with oil or sauce as desired, sealed and sterilized in the usual manner.

In localities where it is the practice to smoke the fish before packing them, the smoking step may be incorporated with any of the previous steps hereinbefore outlined by introducing smoke from any suitable source into the chambers containing the fish, along with the moving air, it being preferred, however, to perform the smoking operation simultaneously with the cooking and drying operations taking place in the second step of the process as described.

The apparatus employed for carrying out the present process is to form the subject matter of a separate application, but for the purposes of illustration it has been shown diagrammatically on the accompanying drawings and from which it may be seen that the shifting of the fish hereinbefore mentioned in connection with the toughening and pre-drying step may be accomplished by shifting the fish from one conveyer belt to another.

The temperature and velocity of the air employed in the different steps and time required to accomplish the desired results may vary somewhat according to conditions prevailing, but the following figures have been found to yield the results desired, namely: toughening and pre-drying step, temperature 140° F., velocity 1500'/min., time 10 to 12 minutes; cooking and drying step, temperature 300 to 325° F., velocity 1500 to 2000'/min., time 15 minutes; and cooling step, temperature 60 to 70° F., velocity 1500 to 2000'/min., time 15 minutes.

It is to be understood that the figures given above are for the purpose of example only and may be varied as conditions demand by having the speed of the conveyor belts and tray chains, velocity and temperature of the air, under control and variable within predetermined limits, without departing from the spirit of the invention.

From the foregoing description it is apparent that a process for preparing fish for canning has been provided by which the fish may be quickly and thoroughly cooked in a manner such that they retain substantially their natural physical appearance, a large percentage of the salt taken up in the brine bath and of their natural flavor unadulterated or diluted by the medium in which they are cooked. In addition to this, the process is one which adapts itself readily to continuous, rapid and large scale production by employing a sequence of operations, all of which are subject to the regulation and control of the operators.

Having thus described my invention what I claim as new is:

1. The process of preparing fish for canning which consists in subjecting the fish to heated air, thence subjecting the fish to air heated to a higher temperature, and thence subjecting the fish to air of a temperature below that first supplied to the fish.

2. The process of preparing fish for canning which consists in subjecting the fish to warm moving air, thence subjecting the fish to moving air of a relatively higher temperature, and thence subjecting the fish to relatively cool moving air.

3. The process of preparing fish for canning which consists in conveying the fish to a chamber through which warm air is forced, shifting the fish, conveying the fish to a second chamber through which air at a relatively higher temperature is forced, and thence conveying the fish to another chamber through which air at a relatively lower temperature is forced.

4. The process of preparing fish for canning which consists in subjecting the fish to the action of a current of warm rapidly moving air, thence subjecting the fish to air of a relatively higher temperature, and thence subjecting the fish to moving air of a relatively lower temperature.

5. The process of preparing fish for canning which consists in subjecting the fish to a current of rapidly moving heated air to dry and cook the same, and thence subjecting the fish to cool moving air.

6. The process of preparing fish for canning which consists in subjecting the fish to a current of rapidly moving heated air to cook the same.

In testimony whereof I affix my signature.

HARRY R. BEARD.